United States Patent [19]
Eichenlaub

[11] Patent Number: 5,311,220
[45] Date of Patent: May 10, 1994

[54] AUTOSTEREOSCOPIC DISPLAY

[75] Inventor: Jesse B. Eichenlaub, Rochester, N.Y.

[73] Assignee: Dimension Technologies, Inc., Rochester, N.Y.

[21] Appl. No.: 896,211

[22] Filed: Jun. 10, 1992

[51] Int. Cl.$^5$ .................. H04N 13/04; H04N 15/00
[52] U.S. Cl. .................................... 348/55; 345/6
[58] Field of Search ............... 358/88, 3, 92; 345/6; H04N 13/00, 13/04–15/00

[56] References Cited

U.S. PATENT DOCUMENTS

| | | | |
|---|---|---|---|
| 4,248,501 | 2/1981 | Simpson | 350/266 |
| 4,649,425 | 3/1987 | Pund | 358/88 |
| 4,717,949 | 1/1988 | Eichenlaub | 358/3 |
| 4,829,365 | 5/1989 | Eichenlaub | 358/3 |
| 5,035,385 | 7/1991 | Eichenlaub | 358/3 |

FOREIGN PATENT DOCUMENTS 0354851 2/1990 European Pat. Off. .
0389842 10/1990 European Pat. Off. .
2206763 1/1989 United Kingdom ............... 358/88

OTHER PUBLICATIONS

Society for Information Display Symposium, Digest of Technical Papers, vol. XX, May 1989, Baltimore, Md., USA, pp. 188–191.

Primary Examiner—Howard W. Britton
Attorney, Agent, or Firm—Cumpston & Shaw

[57] ABSTRACT

An autostereoscopic display with an optical element inserted near the transmissive display has improved brightness of the display, and optionally has incorporated therein a head position sensing device capable of sensing the position of at least one observers head causing the light emitting regions of the device to move in response to data on the observer's head position provided by the head sensing device.

25 Claims, 10 Drawing Sheets

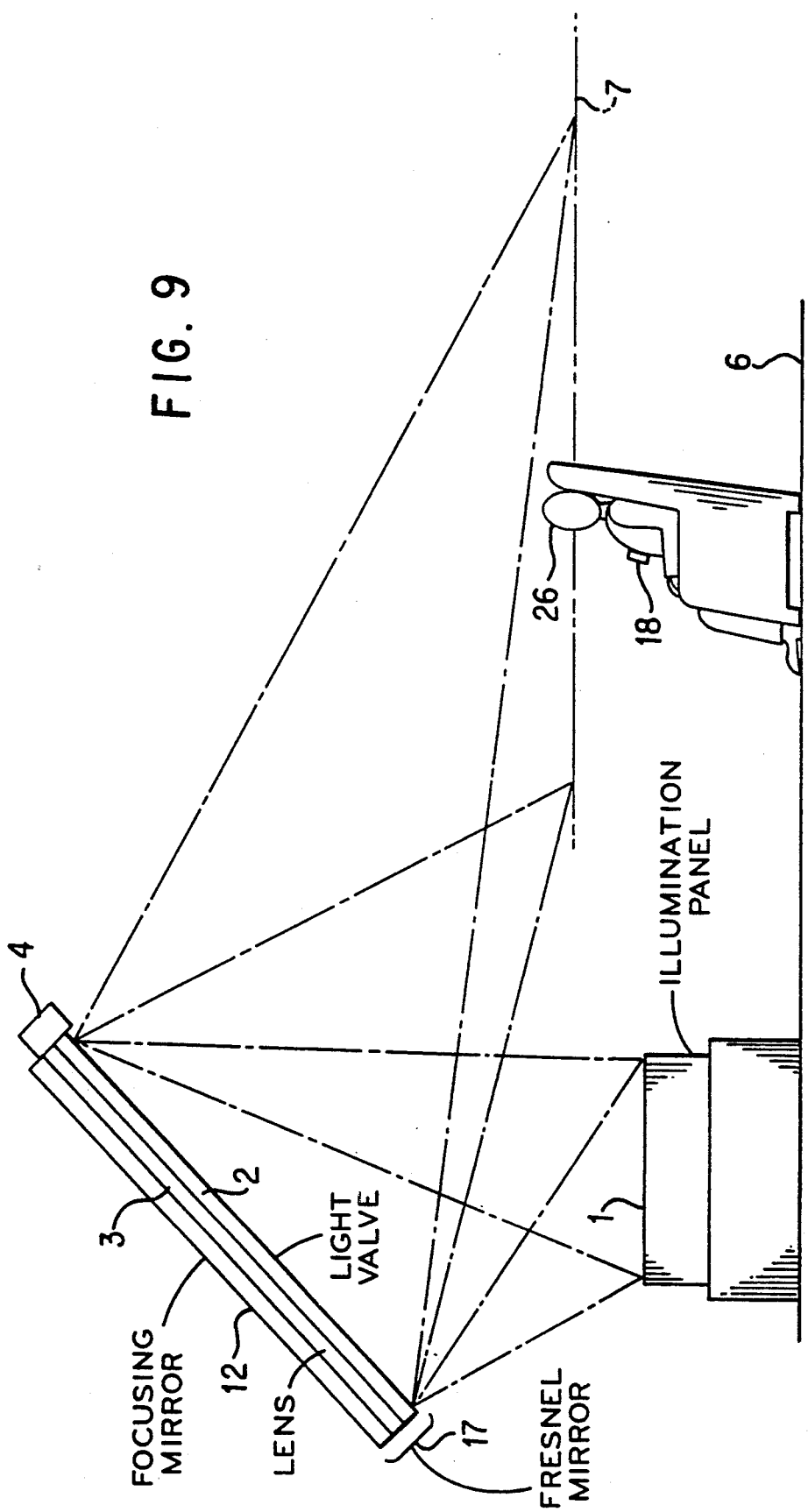

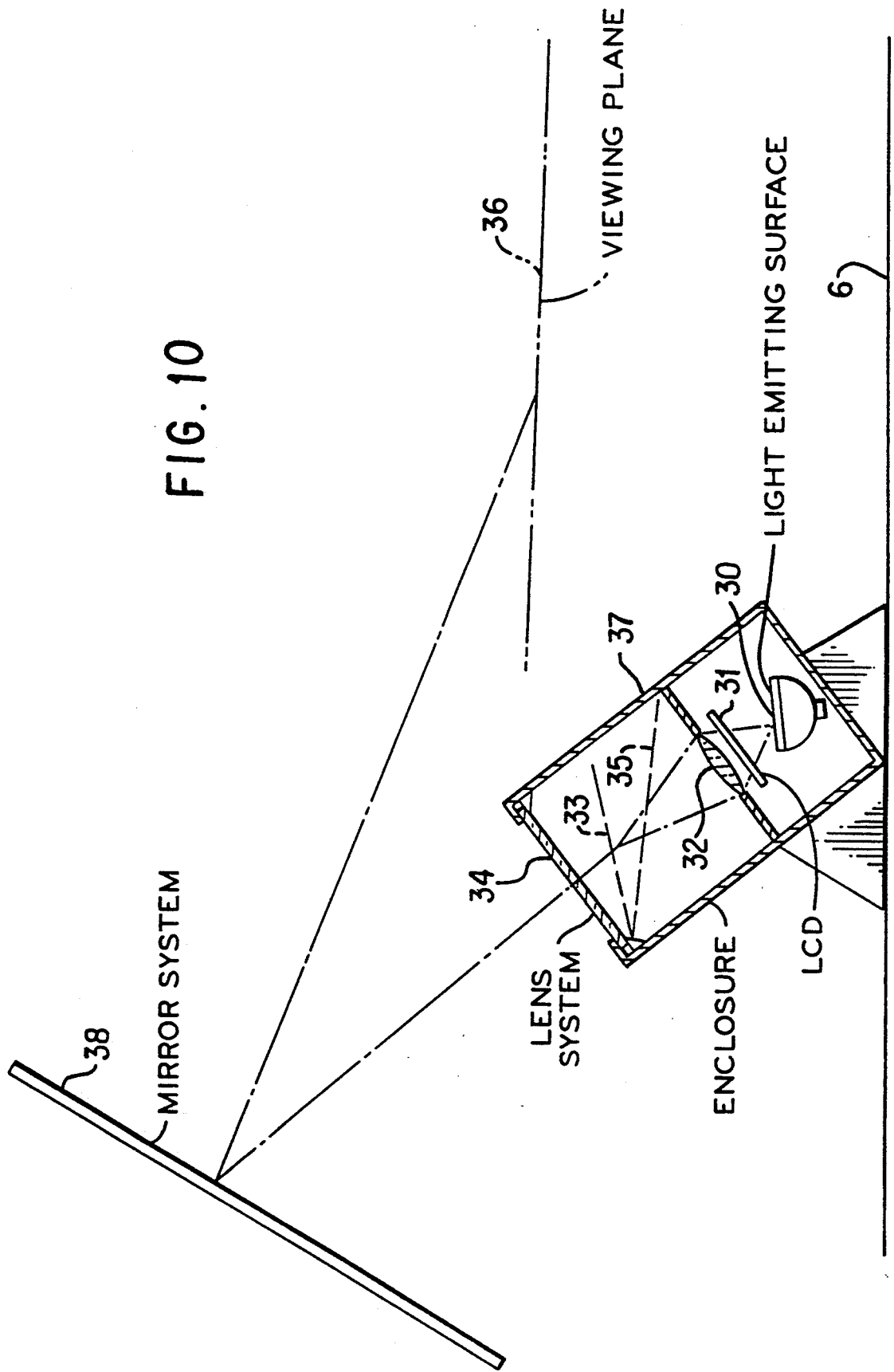

AUTOSTEREOSCOPIC DISPLAY

BACKGROUND

1. Field of the invention

This invention relates to an autostereoscopic device for use in television, computer graphics and the like viewing applications.

2. Prior Art

U.S. Pat. No. 4,717,949 describes an autostereoscopic device possessing a large number of illuminating lines situated behind a transmissive display.

U.S. Pat. No. 4,829,365 discloses a special masking technique that could be used to use this type of system with practically any transmissive display configuration.

U.S. Pat. No. 5,036,385 further extends the capabilities of the above type of autostereoscopic display by adding blinking or moving illumination patterns and colored illumination patterns, which can provide hologram like images that a single observer can look around, or which multiple observers can each see with correct perspective.

All of these displays are intended for viewing by a small number of people situated in a computer workstation, telerobiotic station, or similar environment. They are not suited for viewing by large numbers of people sitting in random locations around a room, as is the case in a typical entertainment television viewing situation.

It is therefore an object of the present invention to provide a display that can present such images using bandwidths and formats identical to those used for television today or contemplated for High Definition Television in the future.

Another object of this invention is to provide a display that can present three dimensional (3D) images to a large number of people sitting in various locations around a medium sized room, such as the living room of a typical house.

Still another object of this invention is to provide a display that can present a different perspective view to a person or persons depending on their locations in front of the display, so that each person sees an undistorted image with the proper perspective associated with that person's position or spacing in the room.

It is a further object of this invention to provide a display that can sense the positions of many people situated in front of it and direct its light only toward those persons, generating only two perspective images for each person, one being a left eye view and the other a right eye view, so that bandwidth is not wasted generating 3D images visible in areas in front of the display where there is no one to observe them.

Yet another object of this invention is to provide a display that presents the same left eye view and the same right eye view to each person sitting in front of the display, thus allowing the minimum bandwidth possible for the transmission of stereoscopic images.

Still other objects will be apparent to those skilled in the art upon reference to the following detailed description and claims.

SUMMARY OF THE INVENTION

In accordance with this invention there is provided improved brightness of an autostereoscopic display having (a) a surface which can generate or transmit regions of emitted light, (b) a transmissive display or reflective light valve display spaced apart from said surface, (c) a device for creating said region of emitted light on from said surface, (d) means to cause the regions which emit light to blink on, then off, one after the other, and to continuously repeat the process, and (e) means to cause the image on said device to change rapidly so that a different image can be shown each time a different light emitting region is turned on, the improvement being that of additionally providing:

an optical element located near said transmissive display and being generally of the same dimensions as said device, which focuses light from the light emitting regions on the first surface onto a plane spaced apart from said display, where by an improved brightness of images is obtained.

BRIEF DESCRIPTION OF THE DRAWINGS

FIG. 9 is a variation of the display system of FIG. 5 which uses a mirror in place of a lens in order to allow people sitting at random locations around in a typical room to see stereoscopic images.

FIG. 10 is a side view of a projection television (TV) system using the type of display shown in FIGS. 1 and 5 as the source for the projected images.

DESCRIPTION OF THE PREFERRED EMBODIMENT

Figure 1:
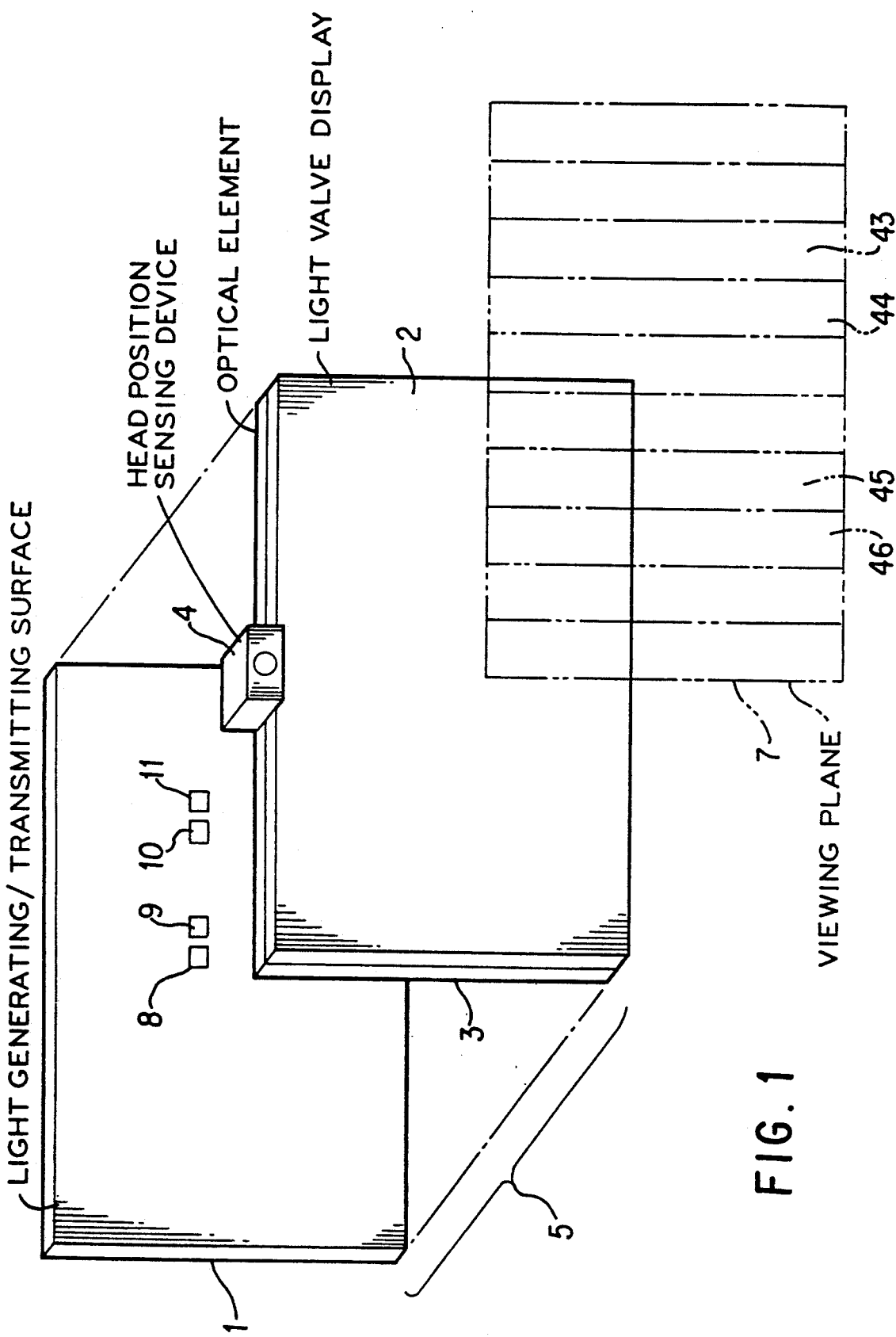
FIG. 1 is a perspective view of the autostereoscopic display of this invention.
Figure 2:
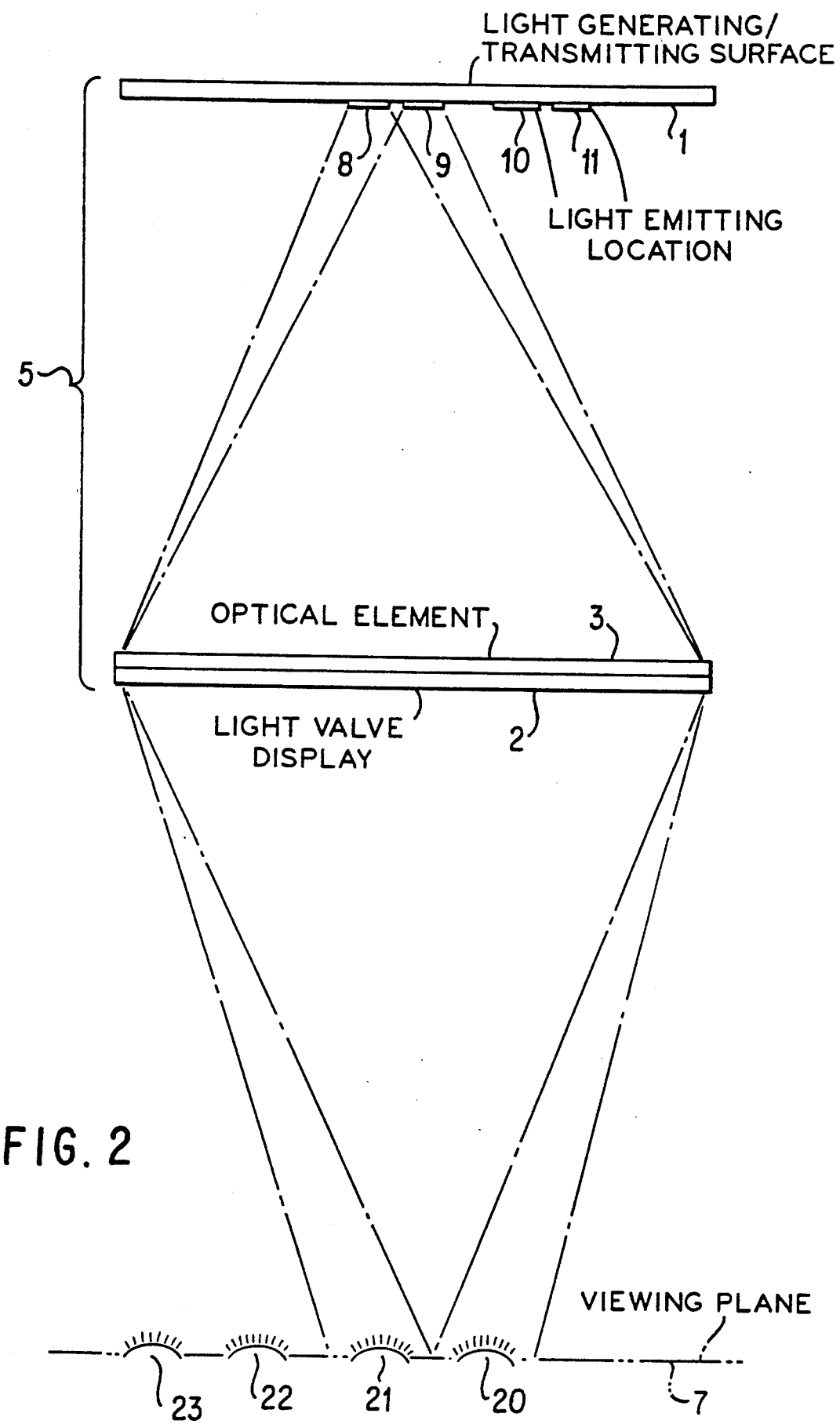
FIG. 2 is a top view of the display of FIG. 1.

FIGS. 1 and 2 illustrate the basic optical principles employed in the autostereoscopic display of this invention. FIG. 1 is a perspective view of the display, and FIG. 2 is a top view of the display of FIG. 1.

The autostereoscopic display of this invention comprises:

(a) a surface 1 which can generate or transmit regions of emitted light, (b) a transmissive display or reflective light valve display light valve 2 spaced apart from said surface, (c) an optical element 3 located near said transmissive or reflective light valve display 2 and being generally of the same dimensions as said display, which focuses light from the light emitting regions on the first surface 1 onto a plane spaced apart from said display 2, (d) means to cause the regions which emit light 1 to blink on, then off, one after the other, and to continuously repeat the process, (e) means to cause the image on the transmissive display 2 to change rapidly so that a different image can be shown each time a different light emitting region 1 is turned on, whereby an improved brightness of the display is created because light is being concentrated towards the observer's eyes located near the plane where the light is being focused instead of being allowed to spread out over a wide angle.

The improved display above can be adapted to a head trackable or sensing of the observer's head display by inclusion of(a) a head position sensing device 4 located on (a) a head position sensing device 4 located on the top portion 25 of and extending forward of display surface 2, and (b) means to cause the light emitting regions on the first surface 1 to move in response to data on the observer's head position provided by the head tracker or head sensing device 4, whereby the autostereoscopic image is transmitted only in the direction of the viewer of said image through the focusing action of the optical element.

A light valve array 2 is placed in front of and spaced apart from the surface of the light emitting panel 1 (which for convenience will simply referred to as panel 1) upon which are displayed light emitting lines, dots, or other shaped areas. In this particular embodiment it is desirable to have as the light valve array 2 a transmissive display such as a liquid crystal display (LCD). An example of a readily available LCD is a smectic liquid crystal device or smectic LCD. In other embodiments a reflective display such as an LCD with a reflective surface directly behind it may be employed as the light valve array.

In the present embodiment the surface of the panel 1 is relatively far back from the light valve array 2. A typical high resolution graphics flat panel gas plasma display with a large number of rows and columns of pixels spaced across its surface would be suitable as the panel. Equally suitable would be a cathode ray tube (CRT) with low persistence phosphors or a back lighted LCD with a fast pixel response time or a number of individual lamps mounted in a row or rows in a plane behind the light valve array 2. Panel 1 could also be a passive, diffuse surface upon which light emitting regions from a secondary source, such as a small CRT, are projected.

A lens 3 is added at or near the light valve array 2. In FIGS. 1 and 2 the lens 3 is shown on the side away from the panel 1. The lens 3 serves to focus light from the surface of panel 1 onto viewing plane 7. The lens 3 need only act to focus light in the horizontal direction, but could also focus light in the vertical direction. The lens 3 in this position could be a convex (glass or plastic) lens, but a fresnel lens is the preferred choice because such a lens will be cheaper, lighter, and more compact than a conventional convex lens.

Panel 1 flashes light emitting locations 8-11 on, then off, one after another so that each location in turn is focused by lens 3 into regions 43-46 in plane 7. Location 8 would first flash on, and the light from it is focused toward region 43. Then location 8 would turn off and location 9 turn on and be focused into region 44. Next location 9 would turn off and location 10 would turn on and be focused towards region 45 and so on until region 11 flashes on, then off. After region 11 turns off he process is repeated starting with region 8.

When location 8 is on the light valve 2 would be displaying a scene with perspective appropriate to viewing from the position within region 43. When location 9 is on a perspective view appropriate to region 44 would be displayed, and so on, so that an observer's eye within any of the regions 43-46 near plane 7 would see a perspective view of some scene that is appropriate to its position. The transmissive display 2 would change images between the time one emitting region turns off and the next region turns on. Although four light emitting locations 8-11, providing light for four regions 43-46 are shown, a larger number of locations, one providing light for each of the regions shown in plane 7, could be used.

The light emitting locations 8-11 shown are square in shape, but, they can have other shape such as vertical bars.

When in the above configuration a considerable amount of bandwidth and graphics operation time is wasted by providing perspective images to locations where no observer's eye is located. Typically, only one or two people will be viewing the display at any given time and their eyes will occupy at most four zones leaving the other zones wasted until the observer move their eyes into the other zones. This inefficiency can be overcome by the use of a head position sensing device known in the industry as a head tracker. The tracker operates in combination with the light emitting region generation surface 1 and the computer or other device which provides the images on the display 2.

A head tracking device, or head sensor, 4 which can be similar to that described in the paper "Head Tracking Stereoscopic Display" by Alfred Schwartz, *Proceedings of the 1985 International Display Research Conference,* herein incorporated by reference, is mounted on or near the display 2. Alternatively, the head tracker, or sensor, 4 can be of the type described by Pund in U.S. Pat. No. 4,649,425. Still other head locating devices can be used. The head tracker determines the location of at least one viewer's head as the viewer sits in front of the device. Ideally, this head tracker 4 should be able to identify and track more than one observer's head. This is possible with the Polhemus magnetic tracking system, which is capable of tracking positions of several people who are wearing emitters 18.

The panel 1 is capable of displaying lines or other shaped illuminating locations, such as the squares 8-11, shown in FIGS. 1 and 2, anywhere across its surface and is capable of moving said locations independently on command from the head tracking system. The regions are moved into such positions that the lens 3 focuses light from locations 8 and 10 into regions in plane 7 were observers' right eyes are located and light from locations 9 and 11 into regions in plane 7 where observers' left eyes are located.

The panel 1 sequentially flashes light emitting locations 8-11 on, then off, one after the other so that each in turn is focused by lens 3 toward the viewer's eyes, 20-23 located in or near plane 7. Location 8 would first flash on, and the light from it focused toward the first viewer's right eye, 20. Then location 8 would turn off, and location 9 would turn on, and be focused on the viewer's left eye, 21. Next, location 9 would turn off and location 10 would turn on and would be focused towards the second viewer's right eye, 22, and then location 10 would turn off and location 11 would turn on to be focused toward the second viewer's left eye, 23.

When location 8 is on, the light valve 2 would be displaying a scene with perspective appropriate to viewing from the position of the first viewer's left eye. When location 9 is on, a perspective view appropriate to the position of that viewer's right eye would be displayed, and so on, so that each observer would see a perspective view of some scene that is appropriate to his position. The transmissive display would change images between the time one emitting region turns off and the next one turns on. Furthermore, as the observer's head moved, the computer would move the locations of light emitting locations 8, 9 etc. so that they would remain focused on his or her eyes. In addition, the computer could change the perspective view on the light valve 2 so that as the observer's heads moved, they would see a changing perspective of the object, just as they would with a real object—they could move their heads and look around corners and so forth.

Reduction in computing time, bandwidths, and image display speeds could be achieved if each of the observers are shown the same two perspective views no matter where they are sitting. In such a case, the locations 8 and 10, to be focused toward all the observers left eyes would be turned on at the same time, and a left eye view of a scene would be shown on light valve 2. Next, all the locations, 9 and 11, that are to be focused toward the right eyes 21 and 23, are turned on at once, and a right eye view of a scene is displayed on transmissive display 5. As before, the locations 8, 9, etc. would move to follow the viewer's eyes. However, the viewer would see the same perspective views as he or she moved back and forth—it would not be possible to look around corners. The effect would be identical to the effect produced with wearing polarized glasses.

Although two pairs of light emitting locations that provide light to be focused toward two observers are shown in FIGS. 1 and 2, more observers could be present, provided that the head tracking system is capable of sensing and tracking all of them. In such a case, a pair of light emitting locations, similar to regions 8 and 9, would be formed on panel 1 for each observer, and positioned on panel 1 in such a location that light coming from them is focused toward each observer's eyes.

Figure 5:
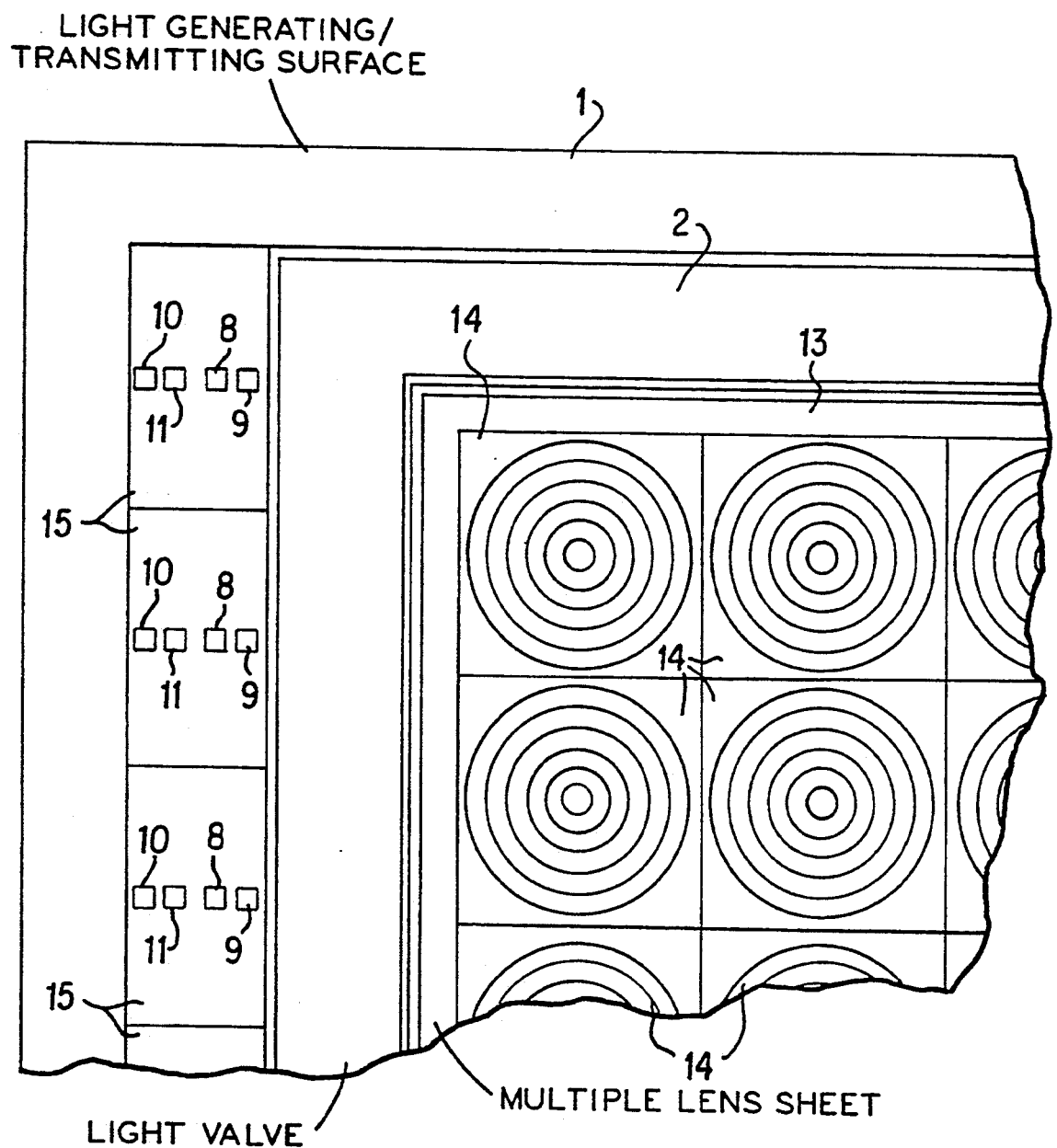
FIG. 5 illustrates a variation of the thin, flat panel display of FIGS. 1 and 2.
Figure 6:
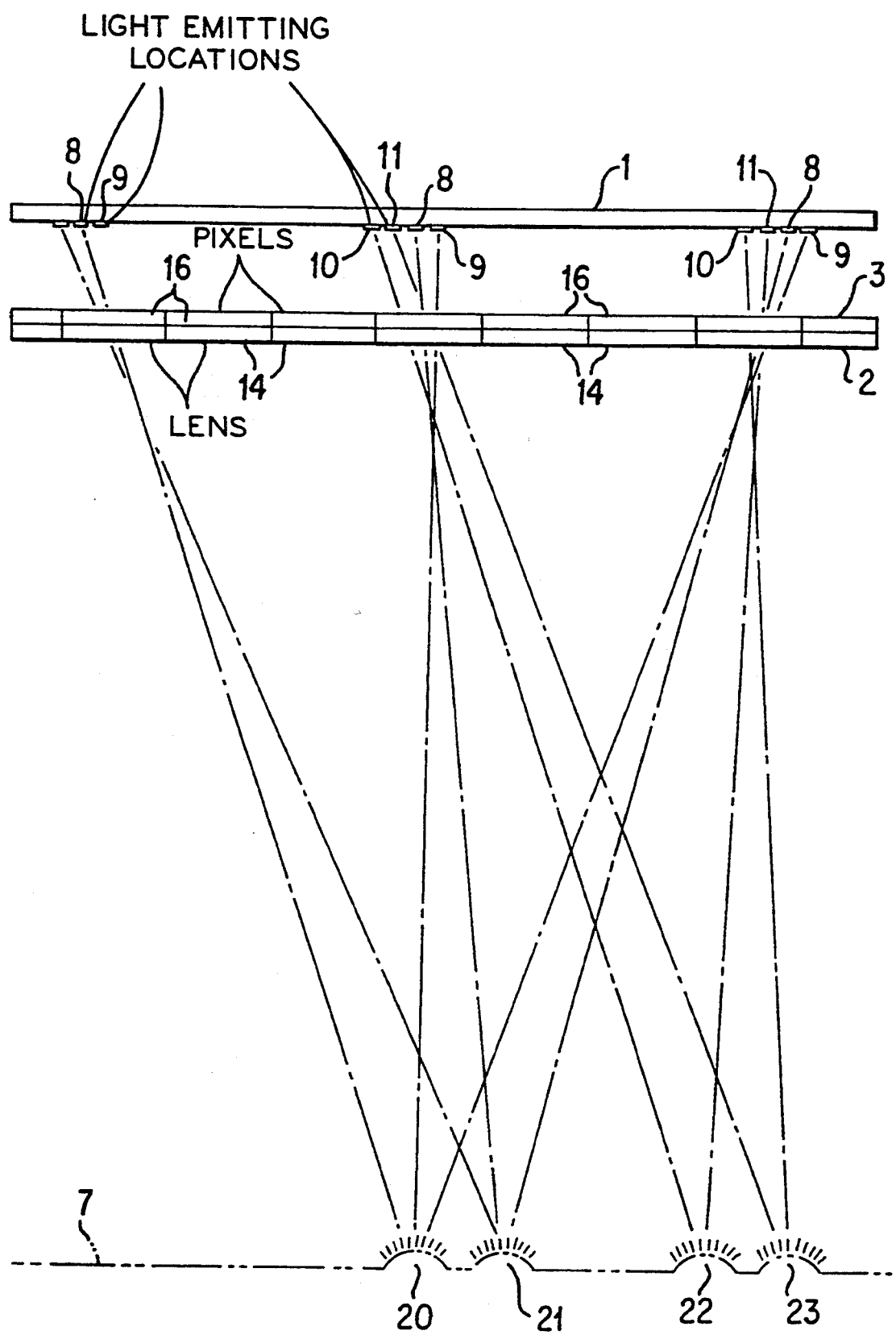
FIG. 6 is a top view of the display of FIG. 5.

FIGS. 5 and 6 show a variation of the display shown in FIGS. 1 and 2 where the thin panel 1 nature of the display 5 is retained. FIG. 5 is a close up perspective view of part of the display 5. FIG. 6 is a top view of the whole display 5. The illuminating panel 1 is situated behind and parallel to the light valve 2. A multiple lens sheet 13 with one square shaped convex or fresnel lens 14 in front of separate groups of pixels 16 on valve 2 is placed a short distance in front of or behind valve 2. The lens 14 focuses light emitted from locations on panel 1 on to viewing plane 7 while head tracker 4 keeps track of each viewer's location. Note that any number of pixels 16 might be covered by each lens 14, from one up to a sizeable fraction of the total number of pixels 16 on the display 2.

A set of light emitting locations 8-11 is displayed behind each group of pixels. Each region is positioned so that it is focused toward one observer's eye in plane 7. The set of light emitting regions that focus on to the observer's left eye 20 can all turn on at once, then the regions focused on that observer's right eye 21, and so on. Alternatively, all the sets of light emitting regions 8, 10 whose light is focused towards the observer's left eyes might be turned on at once while a single "left eye" scene is displayed on the transparent imaging forming device 2 and all the light emitting regions 9, 11 whose light is focused toward the observers' right eyes could be turned on next while device 2 displays a single "right eye" scene.

Optically the arrangement of the device of FIGS. 5 and 6 is identical to a larger number of displays of FIG. 1 tiled together. The operation of each pixel group 16 and the illuminating panel behind it are optically identical to the display of FIGS. 1 and 2.

The variations of FIGS. 1 and 2 are limited in that observers must sit with their eyes near plane 7 in order to see images. In practice, their eyes would have to remain within several inches of plane 7 backwards and forwards for stereo viewing. This situation is fine when the device is being used as a computer screen, or as the display for a video game, because all the users sit relatively still within a few feet of the screen. The situation creates a problem, however, when this type of display is being used as a home entertainment television receiver. In that type of situation, observers are likely to be sitting at random spots across a large room.

In a television viewing situation, however, the observers, at least when seated, will still all have their eyes near the same plane—but in this case it will be a horizontal plane parallel or nearly parallel to the floor 6 of the room and several feet above it. It would therefore be advantageous if viewing plane 7, at which the light emitting locations of panel 1 are focused, were to be horizontal and parallel to the floor 6 of a room instead of vertical and parallel to the screen.

Figure 3:
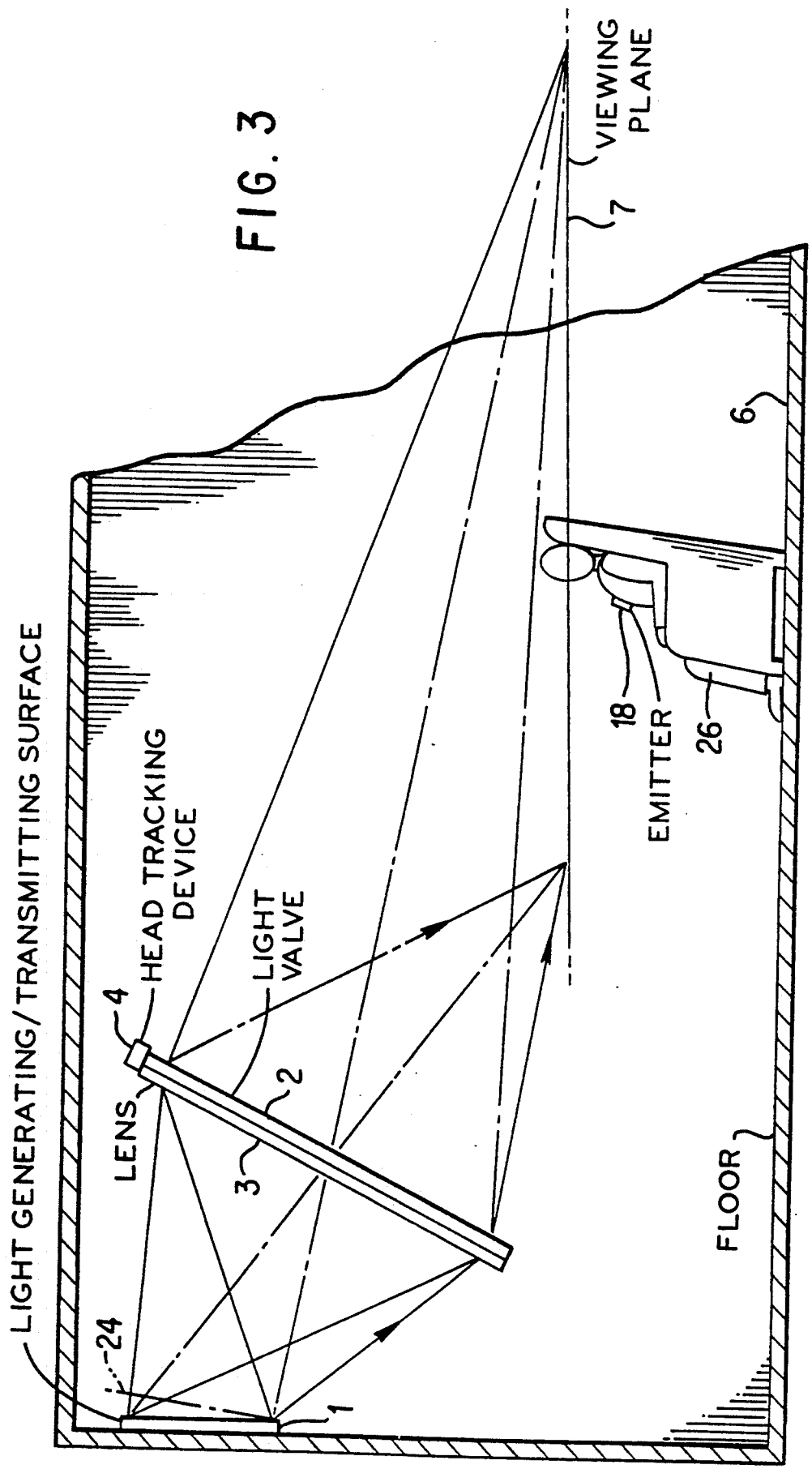
FIG. 3 is a side view of a variation of the device of FIG. 1, using a special projection screen to allow multiple observers seated at random locations in a typical room to see stereoscopic images.
Figure 4:
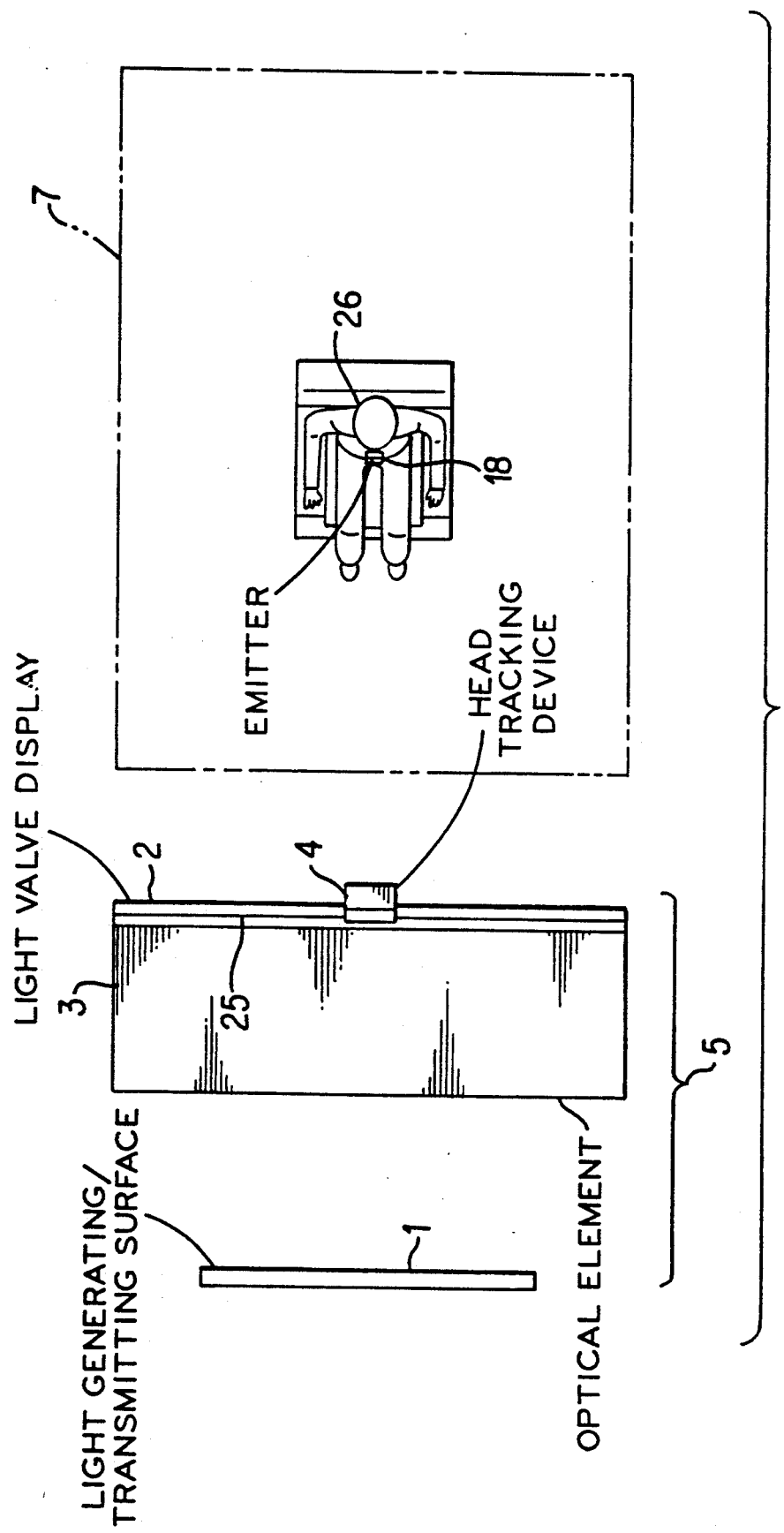
FIG. 4 is a top view of the display of FIG. 3.

A variation in the geometry of the device of FIGS. 1 and 2 allows this to occur. Such a variation is illustrated in FIGS. 3 and 4, with FIG. 3 being a side view and FIG. 4 a top view. Here, the transmissive display 2 is tilted with respect to the illumination panel 1 so that the image of panel 1 in plane 7 is in turn tilted with respect to display 2. If, as shown in FIG. 3, panel 1 is vertical and display 2 is tilted forward the image of panel 1 will be tilted forward at an even greater angle. Given the proper angle of tilt for display 2 the plane 7 can be made parallel or nearly parallel to the floor 6 of the room.

Since a simple lens element 3 will tend to produce a curved image of panel 1 it may be desirable to put a concave surface on panel 1 so that its image is in turn nearly flat and lines in or near plane 7. Multiple lenses along the optical path from panel 1 to plane 7 can also be used to correct the image curvature as well as other deviations from a correct image, as is well known in the art of lens design.

The head sensing device 4 can be employed as shown in FIGS. 1 and 2 wherein the panel 1 is behind and parallel to display 2 or when these elements are tilted with respect to each other as shown in FIGS. 3 and 4 or the figures below. In the situation of FIGS. 3 and 4 the ability to track the observers 26 located in various areas of plane 7 will be particularly useful.

Figure 7:
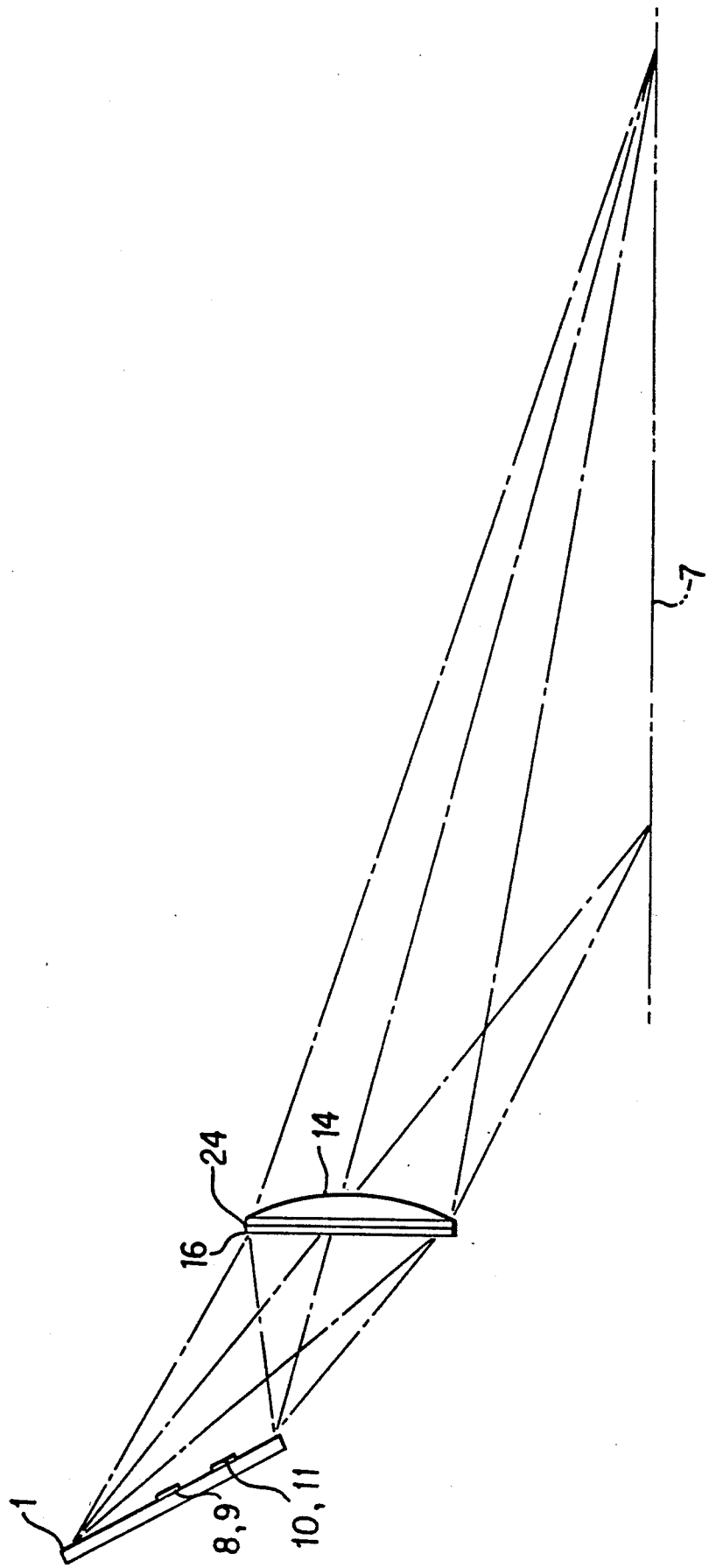
FIG. 7 is a cross section of the display taken along line A—A of FIG. 6.
Figure 8:
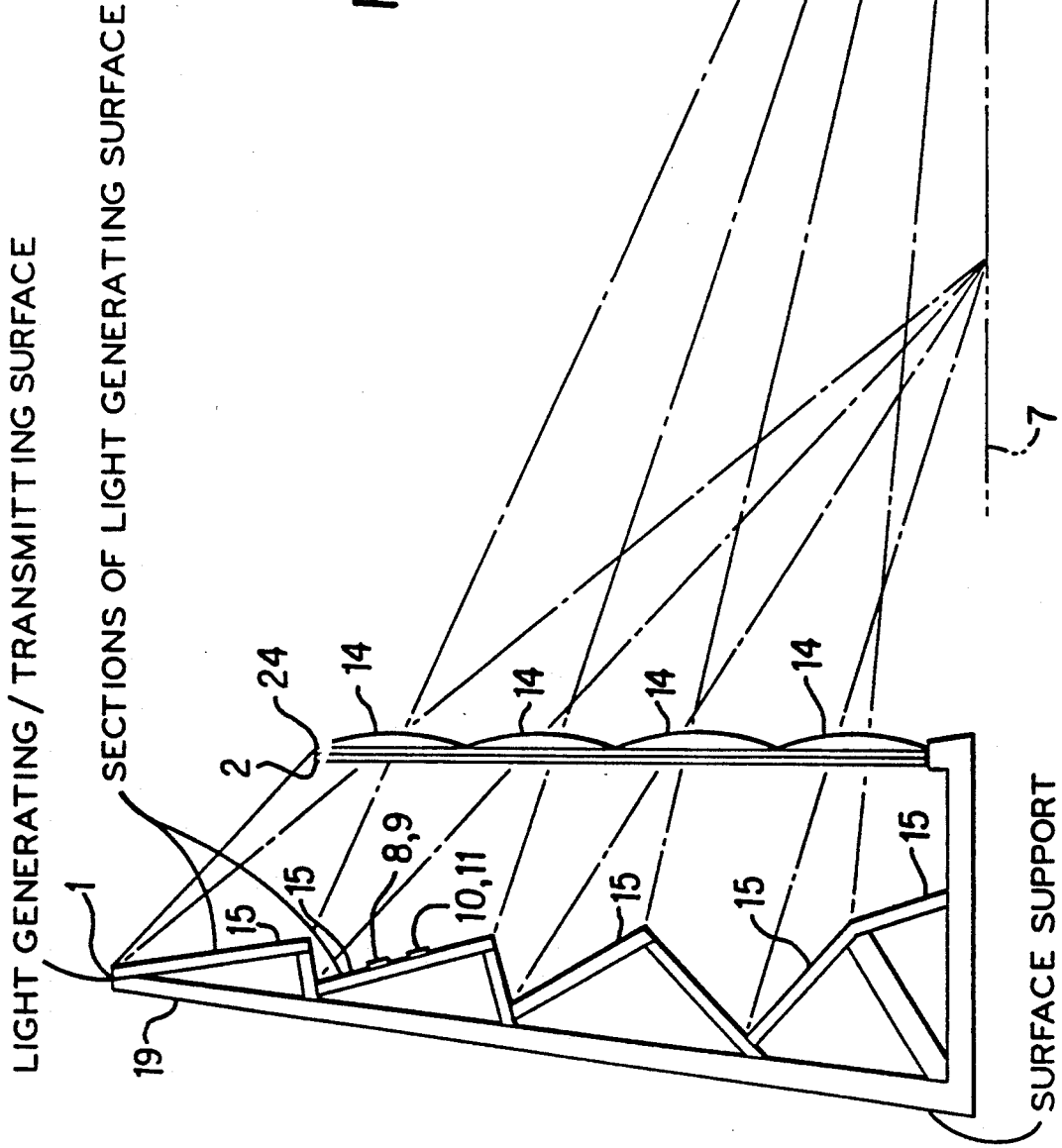
FIG. 8 is a side view of the whole display of FIG. 5.

A variation of the display of FIGS. 5 and 6 shown in FIGS. 7 and 8 allows the viewing plane to be made parallel to the floor 6 of the room. While still retaining the flat panel nature of the display 2, FIG. 7 illustrates how a single "tile" section of display 2 operates in this configuration. FIG. 8 shows a side view of a complete display, each section 15 of the illuminating panel 1 surface behind pixel groups 16 and lens 14, spaced apart from pixel 16 by holding structure 24, is tilted with respect to the plane of the lens 14 and the floor 6 as shown. Each section 15 of the illuminating panel 1 surface is attached to and positioned by the light emitting panel support 19. The top section is farther away from lenses 14 than the bottom. This cause images of spots of light 8, 9 on surfaces 15 to be imaged within a plane 7 that is parallel to the floor 6 as is shown in FIGS. 7 and 8.

As before, a head tracker or sensing device 4 can keep track of the viewer's 26 positions in the arrangements shown in FIGS. 3, 4, 7 and 8. This tracker could be a camera that feeds a digital image of the viewing area into a pattern recognition program which can identify the human face, as described by Pund in U.S. Pat. No. 4,649,425. Alternatively, viewers 26 might wear infrared emitters 18 in the form of small battery powered, button sized devices clipped to their clothing, which will allow such a tracker to keep track of viewer's 26 positions without resorting to pattern recognition.

It should be noted that the optical elements used to focus light from the light emitting regions toward an observer's eyes are not restricted to lenses. As shown in FIG. 9 focusing mirrors 12 or mirror 12 and lens 3 combinations can also be employed.

In FIG. 9 illumination panel 1 is situated parallel or nearly parallel to the floor 6. A light valve 2 is placed at an angle to panel 1 and a fresnel mirror arrangement 17 is placed close to and behind light valve 2. This fresnel mirror 17 would ideally consist of a flat reflective mirror 12 surface directly behind the pixel layer of the transmissive display 2 and a fresnel lens 3 in front of the mirror 12. Alternatively the mirror 12 could consist of an reflective surface with fresnel ridges. This mirror focuses light emitting locations on illuminating panel 2 on to plane 7 which is about the same height from the floor 6 as the height of an average viewer's 26 eyes when he or she is seated. Another alternative would be to use a reflective light valve, as shown in U.S. Pat. No. 4,248,501 (which is also known as the Micro-Curl patent), that functions by making pixels either absorptive or reflective and placing a fresnel lens in front of it.

The arrangement of FIG. 9 requires a rather large light valve, ideally one meter or more across the diagonal. As of this writing there is much activity throughout the world dedicated to devising a practical way to manufacture such a light valve. A variation of the arrangement shown in FIG. 7 would allow projection of the image of a much smaller LCD on to a fresnel mirror. This arrangement is shown in FIG. 10.

In FIG. 10 a surface or plane 30 which displays the light emitting regions is situated at an angle with respect to a medium sized LCD 31 which could measure about 10 inches or 25 centimeters diagonally, a typical size for currently available LCDs. The LCD 31 has a lens or lenses 32 near it which project light emitting regions on surface 30 into an image plane 33 which is tilted with respect to the LCD 31. A second lens or lens system 34 re-images the LCD 31 on to a concave mirror or convergent reflective fresnel mirror 38. It simultaneously re-images the regions in plane 33 onto corresponding locations in plane 35 which again can be tilted with respect to LCD 31 and mirror 32. Plane 35 is angled so that the light emitting regions within it are in turn re-imaged by mirror 38 into corresponding regions of viewing plane 36 situated roughly parallel to the floor 6. The surface and related parts 30, LCD 31, lens 32 and lens 34 can be housed in an attractive enclosure or cabinet 37 to hold components in precise alignment with each other and allow for adjustment of the position and angles of the aforementioned lenses and optical elements relative to lens 35. Additional optical elements such as mirrors can be positioned so as to make the projector unit more compact and or facilitate adjustments.

Today's maximum pixel response times for LCDs, on the order of 100 microseconds, would allow many separate images to be produced every 1/30th of a second, with each frame consisting of an image changing scan of the LCD and an additional 100 microseconds for all the pixels to finish changing. This would allow several people to view a display and see the proper perspective on the image. Of course, many more people could view a TV display where all of the left eye emitting regions turned on at once, and all of the right eye regions turned on at once, thus requiring the presentation of only two images every 1/30th second.

Those readers who are familiar with the art will realize that there are a large number of possible configurations for a transmissive display, lenses, and light emitting regions that will accomplish the task of presenting a left view to multiple viewer's left eyes and a right view to these same observer's right eyes. This disclosure, therefore, does not intend to limit the embodiments to the specific configurations described. It is meant to be inclusive rather than limiting.

It is possible, in all the configurations mentioned above, to provide color by using a display with sets of red, green and blue pixels. It is also possible to employ a black and white transmissive display used in combination with multicolored blinking light emitting regions. For example, each region or set of regions would blink on and off three times, instead of once, before the next region blinks on. The first time each region blinked on, it would emit red light, and the transmissive display would display the red light component of some image. The second time each region turned on it would emit green light, and the transmissive display would display the green component of the same image. The third time the region turned on it would emit blue light, and the display would show the blue component of some image. such multicolored emitting regions could be generated if the emitting surface, such as 1 in FIGS. 1 and 2, were a CRT display or a back lighted LCD.

The foregoing configurations and methods have been described in the foregoing specification for the purpose of illustration and not limitation. Many other modifications and ramifications will naturally suggests themselves to those skilled in the art based on this disclosure. These are intended to be comprehended as within the scope of this invention.

I claim:

1. An autostereoscopic display having (a) a surface which can generate or transmit regions of emitted light, (b) a transmissive display or reflective light valve display spaced apart from said surface, (c) an optical element located near said transmissive or reflective light valve display and being generally of the same dimensions as said display which focuses light from the light emitting regions on the first surface onto a plane spaced apart from said display, (d) means to cause the regions which emit light to blink on, then off, one after the other, and to continuously repeat the process, and (e) means to cause the image on said transmissive or reflective light valve display to change rapidly so that a different image can be shown each time a different light emitting region is turned on, the improvement being that of additionally providing:

an optical element located near said transmissive display and being generally of the same dimensions as said transmissive or reflective light valve display, which focuses light from the light emitting regions on the first surface onto a plane spaced apart from said display, whereby improved brightness of the display is obtained.

2. The display of claim 1 where the light emitting regions consist of pairs of light emitting regions situated next to each, with members of each pair being situated along a horizontal line.

3. The display of claim 1 wherein the surface which can generate or transmit regions of emitted light is substantially parallel to the light valve.

4. The display of claim 1 where the light emitting regions consist of two sets and all members of one set are turned on, then off, at the same time, and then all the members of the second set are turned on, then off at the same time and the process is repeated continuously.

5. The display of claim 1 where the optical element is a fresnel lens.

6. The display of claim 1 where the transmissive display is an liquid crystal device.

7. The display of claim 1 where the light emitting surface is tilted with respect to the transmissive display and lens so that light from the emitting regions is focused onto a plane that is parallel to the floor of a room.

8. The display of claim 1 when used as a display for computer generated images.

9. The display of claim 1 when used as a display for television images.

10. The display of claim 1 where each light emitting region turns on and off three times, each time emitting a different color and the process is repeated continuously while the display is turned on.

11. The display of claim 10 where the three colors emitted are red, green and blue.

12. The display of claim 1 where the single lens is replaced by a lens sheet containing multiple lenses.

13. The display of claim 12 where the surface with light emitting regions is up close to the transmissive display and emits light from at least one pair of locations behind every lens of the lens sheet.

14. The display of claim 13 where the surface with light emitting locations is replaced by multiple surfaces with light emitting locations, one behind each lens or row of lenses and each surface being tilted so that light from the emitting locations on that surface is focused onto a plane that is parallel to the floor of a room.

15. The display of claim 1 where the optical element contains a mirror with a reflective surface situated near the transmissive display on the side of the transmissive display opposite the surface with light emitting regions.

16. The display of claim 15 where the mirror is a fresnel mirror.

17. The autostereoscopic display of any of claims 1 to 10 or 15 adapted to a head trackable or sensing the location of the observer's head by additionally providing:

(1) a head position sensing device, and
(2) means to cause the light emitting regions on the first surface to move in response to data on the observer's head position provided by the head sensor or tracker, whereby the autostereoscopic image is transmitted through the focusing action of the optical element only in the direction of the viewer of said image.

18. The display of claim 17 where each pair of light emitting regions are moved and positioned in response to data from the head position sensor, so that light from one member of the pair is focused by the lens onto an observer's left eye, and light from the other member of the pair is focused onto the observer's right eye.

19. The display of claim 17 where the transmissive display displays an image of some scene with perspective appropriate to each observers's eye location each time a light emitting region flashes on.

20. The display of claim 15 where the mirror is tilted with respect to the surface with light emitting regions.

21. The display of claim 20 where the light emitting surface, the transmissive display, and the mirror are positioned and tilted so that light from the light emitting regions is focused onto a plane which is parallel to the floor of a room.

22. The display of claim 21 wherein a second optical element is placed between the transmissive display and the optical element with the mirror which is hereby designated the third optical element, such that the second optical elements forms an image of the transmissive display on or close to the mirror.

23. The display of claim 22 wherein said optical element is placed between the surface with light emitting regions and a second optical element in such a manner that images of light emitting regions on the surface with light emitting regions are first imaged into a plane generally situated near the second optical element before being imaged into the viewing plane by the third optical element containing a mirror.

24. The display of claim 22 where the surface with light emitting regions and the optical elements and the transmissive display are tilted with respect to one another in such a manner that images of light emitting regions on the surface are imaged on to a plane that is situated roughly parallel to the floor of a room after light from them passes through the various optical elements.

25. The display of claim 24 wherein the surface with light emitting regions the transmissive display the second optical element and the first optical element are contained in a housing which forms a projector unit and which allows positioning of the elements with respect to each other and to the mirror by internal adjustments and by positioning of the projector unit as a whole with respect to the mirror.

* * * * *